United States Patent [19]

Blanchard

[11] Patent Number: 5,556,498

[45] Date of Patent: Sep. 17, 1996

[54] METHOD OF MANUFACTURING A RECREATIONAL VEHICLE CABIN

[75] Inventor: Raymond W. Blanchard, White Lake, Mich.

[73] Assignee: Roamer Corporation, Auburn Hills, Mich.

[21] Appl. No.: 358,719

[22] Filed: Dec. 19, 1994

[51] Int. Cl.⁶ .............................. B29C 65/52; B62D 29/04
[52] U.S. Cl. ........................ 156/245; 156/292; 156/305; 264/250; 296/901
[58] Field of Search .................................... 156/245, 228, 156/292, 305; 296/156, 181, 901; 264/517, 250, 309

[56] References Cited

U.S. PATENT DOCUMENTS

| | | | |
|---|---|---|---|
| 3,084,973 | 4/1963 | Beckley | 264/309 |
| 3,271,224 | 9/1966 | Bjernekull | 156/245 |
| 3,455,596 | 7/1969 | Krutzikowsky . | |
| 3,574,390 | 4/1971 | Metsker | 296/156 |
| 3,652,119 | 3/1972 | Hall | 296/164 |
| 3,775,214 | 11/1973 | Winters . | |
| 3,811,141 | 5/1974 | Stoeberl . | |
| 3,879,240 | 4/1975 | Wall | 156/78 |
| 4,094,027 | 6/1978 | Vernon . | |
| 4,118,814 | 10/1978 | Holtom . | |
| 4,314,726 | 2/1982 | Artweger et al. . | |
| 4,542,933 | 9/1985 | Bischoff . | |
| 4,755,245 | 7/1988 | Viel | 156/245 |
| 4,913,485 | 4/1990 | Moffatt et al. . | |

*Primary Examiner*—Daniel J. Stemmer
*Attorney, Agent, or Firm*—Young & Basile

[57] ABSTRACT

A lightweight fiberglass recreational vehicle cabin for carriage on a pickup truck is fabricated in two laterally distinct halves which are subsequently bonded together to form a unitary structure. Each cabin half is fabricated inside of a female mold which is supported on a horizontal pivot axis so that during the fabrication process the mold may be rotated to whatever orientation best facilitates each fabrication step. Each cabin half is fabricated by applying a layer of fiberglass to the inside of the female mold, applying a layer of polyurethane foam over the fiberglass, and placing preformed fiberglass interior shell segments inside the mold to contact the polyurethane foam, thereby forming a sandwich-type wall structure. The two molds are then brought together to place the cabin halves in registry, and they are bonded together by applying joining materials to the inside of the seam. The cabin structure also features compartments with hinged doors for enclosed carriage of jack stands and a molded fiberglass holding tank cover with an integrally formed step to provide assistance in entry and egress through the passenger door.

8 Claims, 6 Drawing Sheets

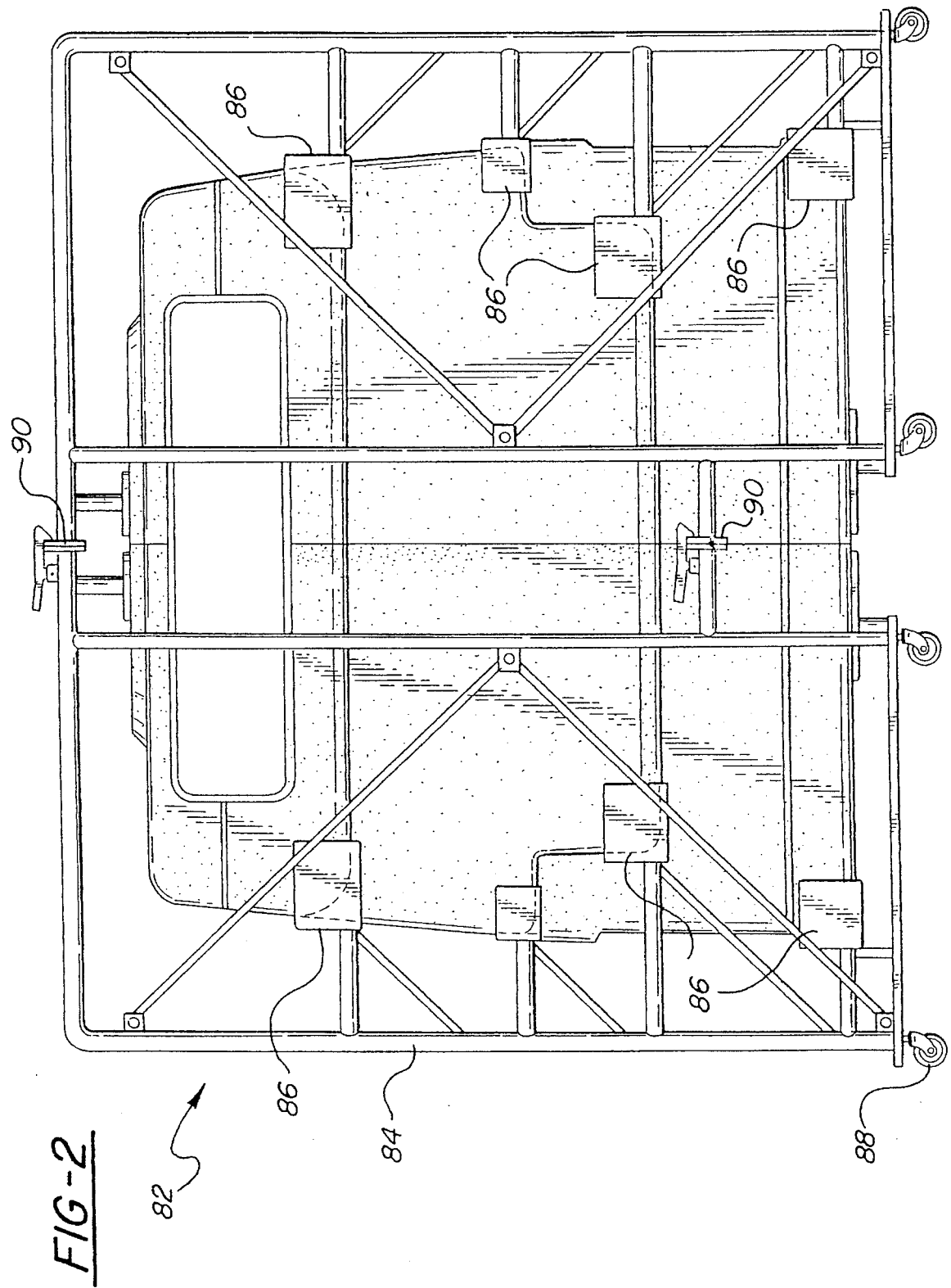

METHOD OF MANUFACTURING A RECREATIONAL VEHICLE CABIN

FIELD OF THE INVENTION

The present invention relates to a recreational vehicle cabin structure mounted on an automotive vehicle such as a pick-up truck and more particularly to a method of producing a molded, unitary cabin structure from fiber-reinforced composite materials.

BACKGROUND OF THE INVENTION

The growing popularity of pick-up trucks, as evidenced by their increased percentage of total vehicle sales, has pointed out the need for a lightweight pick-up truck camper. The camper units currently available on the market, when fully equipped with appliances, are too heavy to be carried on the more popular full size pick-up trucks such as the Ford F-150, the best selling pick-up truck in the United States over the past several years. The pick-up campers available today, when equipped with a refrigerator, stove, toilet system, and water tank, weigh on the order of 1700 pounds, while the maximum weight capacity of the Ford F-150 is in the 1500 pound range.

While it would be advantageous to reduce the weight of a camper cabin, this is difficult to accomplish without sacrificing strength and rigidity. When the camper is mounted on the truck it derives substantial strength from the truck bed and chassis. But when removed from the truck bed and supported on jack stands or blocks the camper must still be rigid enough to withstand normal usage. This requirement has driven most prior camper designs to use a relatively heavy frame, usually made of metal, as the primary load-bearing portion of the cabin structure.

Another critical factor in the design of recreational vehicle cabins is cost, and this is directly related to the production technique used. To achieve low cost, a production method should involve the assembly of a minimum number of parts and should not require a great deal of skilled labor to assemble and finish the cabin.

Several previous camper designs have attempted to reduce weight by using fiber-reinforced plastic (FRP) as the main cabin material. U.S. Pat. No. 3,879,240 issued Apr. 22, 1975 utilizes an exterior shell of FRP molded in several sections which are placed over a metal framework and bonded together with adhesive. Low density polyurethane foam insulation is then sprayed onto the inside of the shell in a thickness sufficient to cover the frame, with a thin second layer of high density polyurethane foam applied over the insulation to form the interior surface of the camper structure. This construction requires the fabrication of a relatively heavy and difficult-to-construct metal framework to provide the structure with rigidity. It also results in a somewhat uneven interior surface due to the inexact nature of the foam spraying process.

U.S. Pat. No. 3,652,119 issued on Mar. 28, 1972 discloses a telescoping camper cabin which pops up for use. Upper and lower cabin sections are produced, each consisting of an outer and an inner FRP shell with a metal framework trapped therebetween. Low density insulating foam fills the remaining space between the inner and outer shells. Again, the metal frame is the load-bearing portion of the structure.

In U.S. Pat. No. 4,314,726 issued Feb. 9, 1982 a cabin structure is disclosed that is made from a sandwich of rigid plastic foam between an outer skin of aluminum and an inner skin of wood. A high pressure forming process is required to produce this laminate, and many subsequent fabrication steps are needed to shape the material into a cabin structure.

BRIEF SUMMARY OF THE INVENTION

It is an object of the present invention to provide a recreational vehicle cabin structure of unitary fiber-reinforced composite construction which is lightweight, strong and inexpensive to produce.

A more specific object is to provide a pick-up truck camper having walls of a sandwich-type construction in which inner and outer layers of fiber-reinforced plastic (FRP) are separated by a core of low density polyurethane foam (LDPF).

In general these objectives are achieved by utilizing a construction process in which the cabin structure is produced in two laterally distinct segments each of which is fabricated inside of its own female mold. Each cabin segment is produced by forming an outer shell of FRP inside of the female mold, applying a layer of LDPF to the inside of the outer shell and inserting one or more pre-molded FRP inner shell segments into the mold to contact the LDPF and thereby form a sandwich composite wall structure. The two molds are then brought together to place the adjoining edges of the two cabin segments in registry where they are bonded together to form a unitary cabin structure.

By completing this process before the outer and inner shells have fully cured, the entire structure bonds together into a unitary and effectively seamless whole as the components cure. The assembly of each of the two cabin segments while still in their respective female molds results in a high level of dimensional accuracy so that the wall thickness of the finished structure may be closely controlled and the two cabin segments will align exactly when joined together.

In the preferred embodiment described herein, the inner shell segments are molded to form the desired interior contours of the camper cabin such as counter tops, seating areas, storage cabinets, and appliance housings. Plumbing and electrical wiring components are secured to the back sides of the inner shell segments so that when these are placed in position inside of the outer shells, the components will be properly located inside of the resulting wall structure.

BRIEF DESCRIPTION OF THE DRAWINGS

FIG. 2 is a head-on view of left and right shell segments being joined with one another in accordance with a second embodiment of the present invention.

DETAILED DESCRIPTION OF THE PREFERRED EMBODIMENTS

Figure 1:
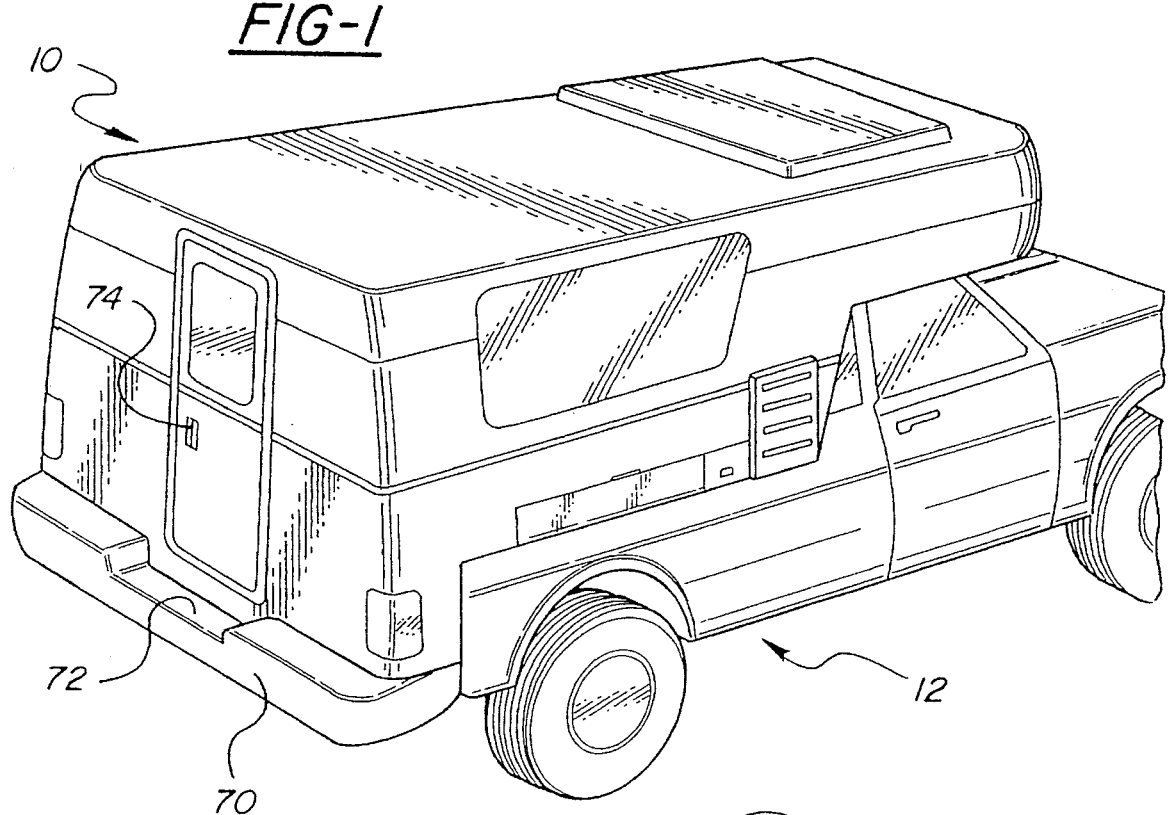
FIG. 1 is a perspective view of a camper cabin in accordance with the present invention mounted on a pickup truck.

FIG. 1 shows the pick-up truck camper 10 of the present invention mounted for use on a pick-up truck 12.

Figure 3:
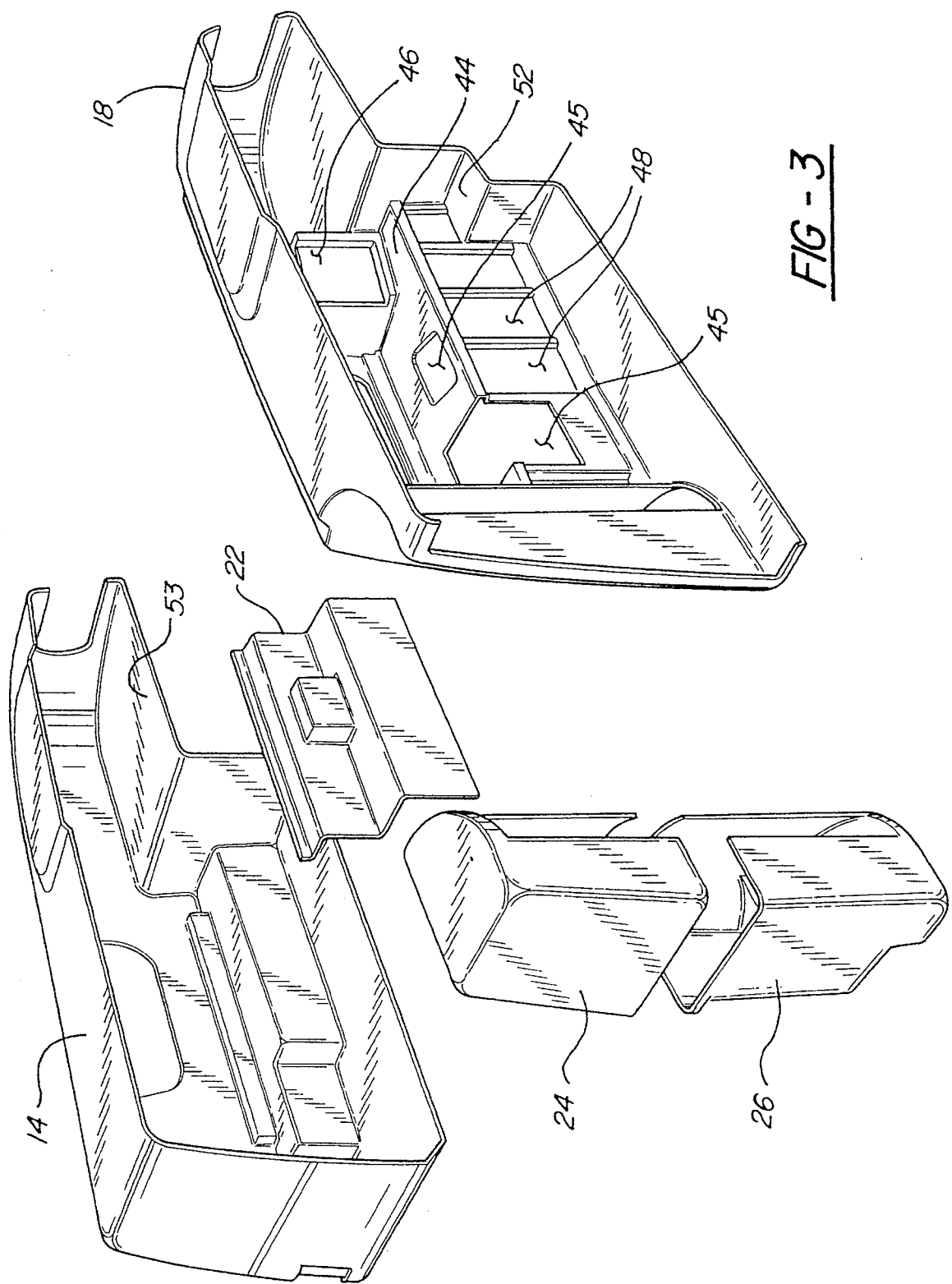
FIG. 3 is an exploded view of inner and outer shell segments which together make up the left cabin half.
Figure 4:
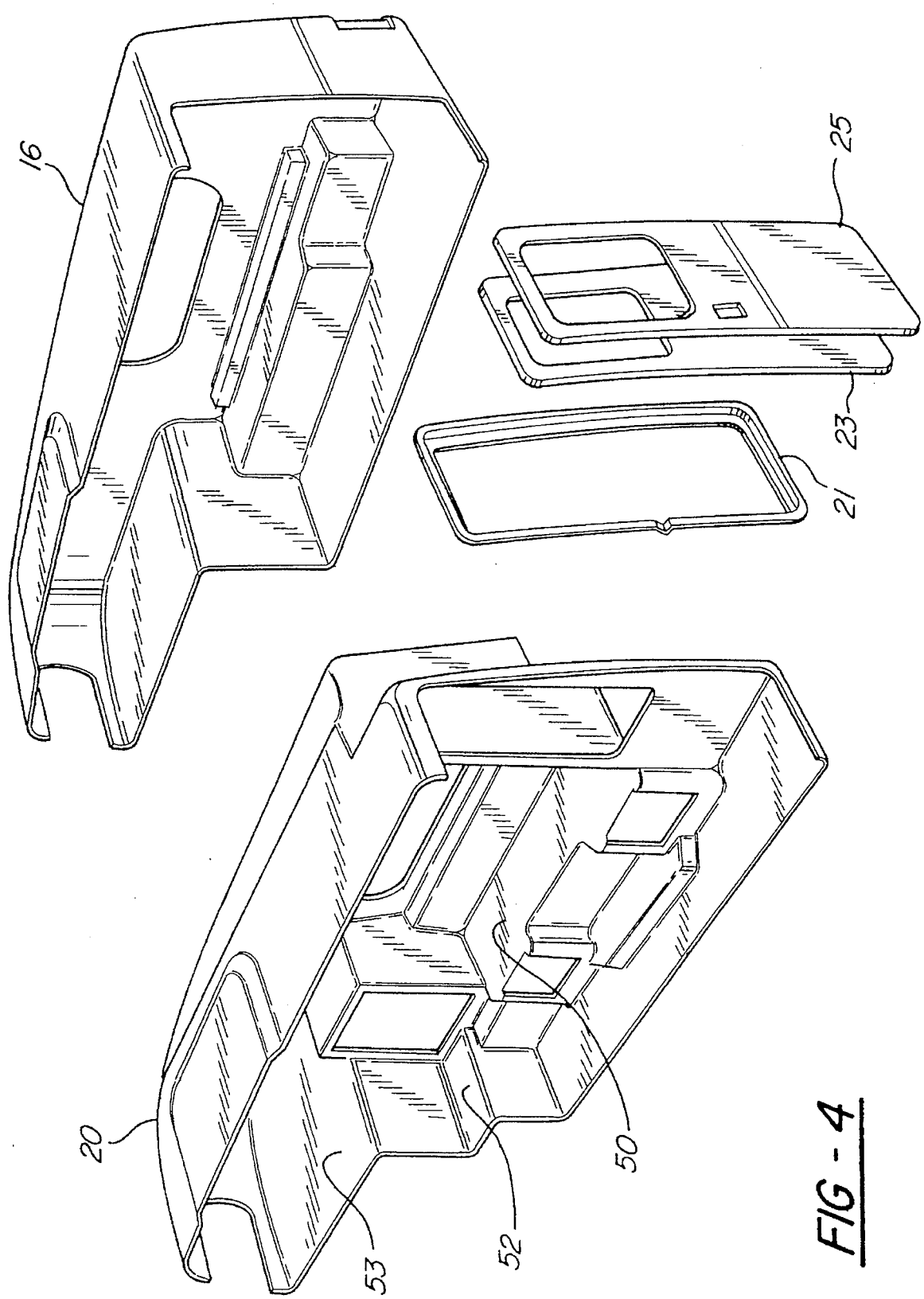
FIG. 4 is an exploded view of the inner and outer shell segments which together make up the right cabin half.

The major structural components which make up camper 10 are shown in FIGS. 3 and 4. These include left and right outer shell segments 14, 16, left and right inner shell segments 18, 20, left liner segment 22, and upper and lower bath enclosure segments 24, 26. All of these cabin segments are molded from a fiber-reinforced plastic (FRP) material, preferably by the conventional spray forming technique in which an epoxy resin, a hardener, and strands of glass fibers are supplied to a spray gun. The resin and hardener are combined under pressure in the spray gun nozzle and the fiber strands are cut into short lengths (usually approx. 1 to 1½ inches) by a rotary cutting head in the nozzle, and the resulting mixture is sprayed onto a mold surface in a thin layer. A mold is constructed for each of the segments, female molds for outer shell segments 14, 16, and male molds for the other segments. As will be described hereinafter, the inner shell segments are taken off of their molds and placed inside of their corresponding outer shell segment to form left and right cabin halves which are then joined together along their edges in a bonding operation which results in the creation of a unitary cabin structure.

FIG. 4 also shows a rear door frame 21, inner door panel 23, and outer door panel 25, each of which is molded separately from an epoxy resin compound.

Figure 6:
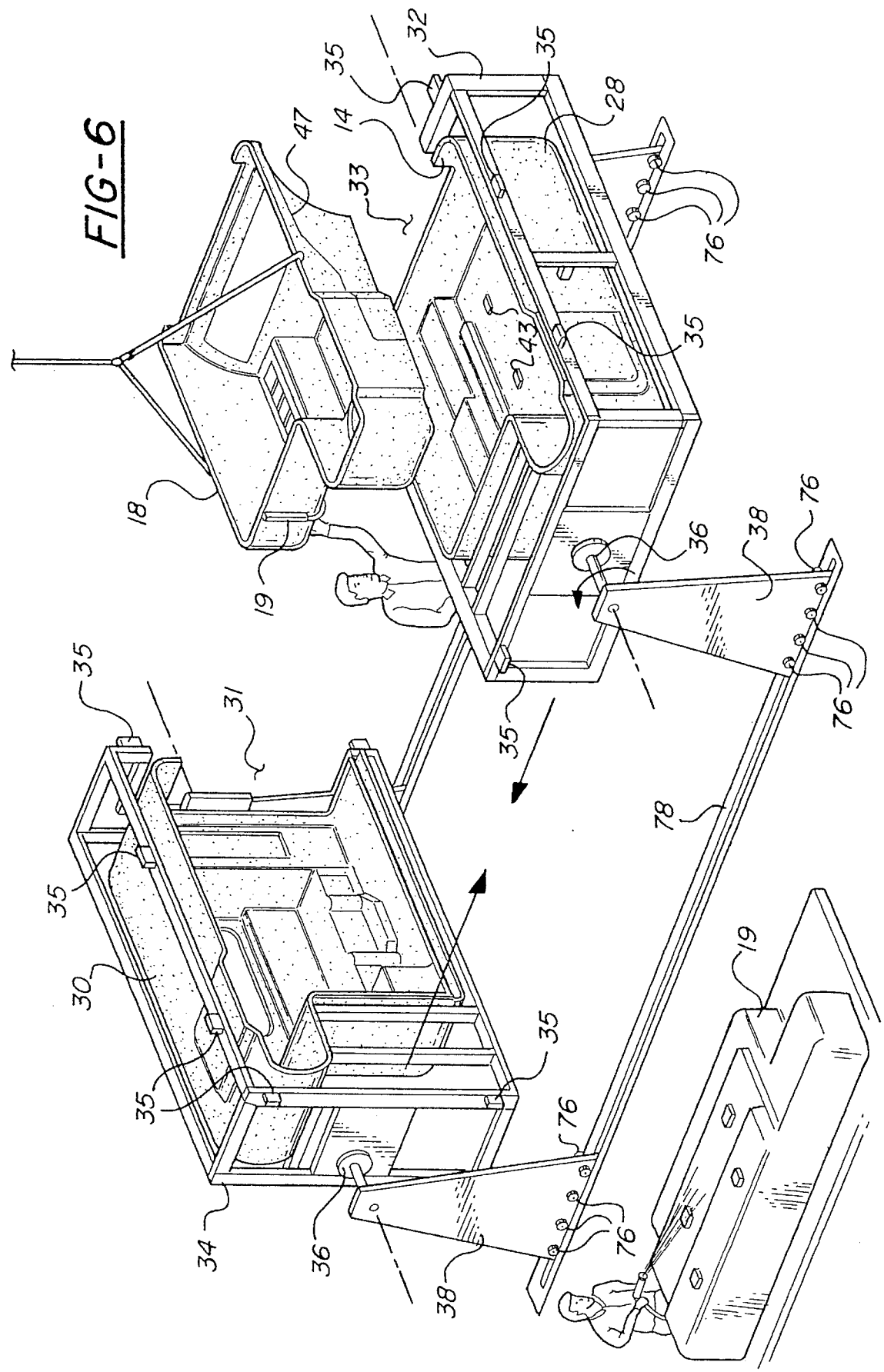
FIG. 6 is a overall view of the cabin construction method of the present invention.

FIG. 6 shows the left and right outer molds 28, 30 supported inside of left and right mold fixtures 32, 34 respectively. Mold fixtures 32, 34 are rigid structures made from wood or the like which support outer molds 28, 30 throughout the fabrication process. Attachment points 36 are provided on mold fixtures 32, 34 which allow the fixtures to be pivotably mounted on support stands 38. Mold fixtures 32,38 may be rotated about attachment points 36 so that the spraying operations involved in the fabrication of outer shell segments 14, 16, may always be directed substantially downward. These spraying operations include the conventionally known steps of first applying a thin coating of gelcoat to the surface of outer molds 28, 30, then spraying on a layer of FRP with a spray gun (not shown). The application of a smooth, even layer of both these materials is important to the appearance and strength of the finished product and is facilitated by rotating molds 28, 30 to whatever orientation is necessary to permit the spraying to be directed substantially downwardly on to all portions of the mold. As seen in FIG. 6, the mold fixtures 32, 34 may be rotated through at least 180 degrees to achieve this downward spray direction on all portions of outer molds 28, 30.

Interior shell segments 18, 20, 22, 24, 26 are formed in the conventionally known manner by spraying a layer of gelcoat onto appropriately shaped male molds, followed by a sprayed-on layer of FRP. The male mold for left inner shell segment 18 is indicated at 19 in FIG. 6. The interior segments are formed substantially simultaneous with the outer shell segments 14, 16, and are removed from their molds after having cured enough to retain their shape when handled, but before reaching full cure. As the FRP is being sprayed onto the male molds, wooden reinforcements 42 are positioned on the molds at desired locations. FRP is sprayed around the wooden reinforcements 42 to bond them in place in the interior segments as they are formed. After the interior segments are removed from their molds, wiring 47 for electrical appliances, outlets, and lights and tubing 49 for the camper plumbing system is positioned on the back faces of the interior segments in the required locations and attached to the shell segments by threaded fasteners which screw into the wooden reinforcements 42.

After outer shell segments 14, 16, have been formed inside of outer molds 28, 30 but before these segments have had time to cure significantly, outer molds 28, 30 are rotated to the horizontal, open-end up position (as exhibited by the left side mold in FIG. 6) and a layer of low density polyurethane foam (LDPF) is applied to the inside surfaces of the newly formed outer shell segments 14, 16. The LDPF is formulated to exhibit a minimum of expansion from application through full cure in order to achieve a high degree of dimensional accuracy in the finished product.

To more accurately control the thickness of the LDPF layer, small wooden or plastic spacer blocks 43 are placed on the inside surfaces of the outer shell segments 14, 16 before the LDPF is applied. The spacer blocks 43 have a thickness equal to the desired thickness of the LDPF core in the resulting sandwich wall construction.

Interior segments 18, 20, 22, 24, 26 are then placed in position inside of outer shell segments 14, 16 to contact the sprayed-in layer of LDPF and the spacer blocks, thereby forming walls consisting of a core of LDPF sandwiched between two layers of FRP. In FIG. 6 the left interior shell segment 18 is shown being lowered into place inside of left outer shell segment 16. The electrical wiring 47 and plumbing 49 attached to the back faces of the interior shell segments are trapped between the inner and outer layers of the wall structure and surrounded by the LDPF core.

Referring now to FIG. 3, it is apparent that left interior shell segment 18 is shaped to provide desired interior cabin contours such as a counter top 44 with openings 45 for the installation of a sink and a gas stove (not shown), upper cabinets 46 and lower cabinets 48. Left liner segment 22 is inserted into left outer shell segment 14 before the placement of left interior shell segment 18 to form the inner layer of the sandwich wall construction in the area behind left interior shell segment 18 and provide a smooth, regular surface inside of the storage areas accessible through the openings in lower cabinets 48.

A bath enclosure located at the rear of the left cabin half is formed as an upper segment 24 and a lower segment 26 so that there will not be a seam along the floor of the bath enclosure that might leak water if improperly sealed. A shower fitting (not shown) is mounted in the upper bath enclosure segment 24 and a drain (not shown) is located in the bottom of lower bath enclosure segment 26. A small chemical toilet (not shown) of conventional design is also located inside the bath enclosure. Bath enclosure segments 24 and 26 are put in position inside of left outer shell segment 14 before the placement of left interior shell segment 18. A layer of LDPF is applied to the exterior surfaces of bath enclosure segments 24, 26 so as to form the core of a sandwich wall structure when interior shell segment 18 is inserted into outer shell segment 14 on top of and covering bath enclosure segments 22, 26.

As is best seen in FIG. 4, right interior shell segment 20 is configured to include a seating area 50 for use with a fold away table (not shown) of the type commonly used in recreational vehicles and boats. When the fold away table is stowed, the seating area 50 may be converted into a bunk bed in a manner conventionally known in the recreational vehicle field.

The forward lower ends of interior shell segments 18, 20 are shaped to provide a step 52 to assist passengers in climbing into the over-cab sleeping berth 53. The volume between step 52 and the inner surface of exterior shell segments 14, 16, houses a water tank (not shown) to supply the sink and the shower.

In some portions of the cabin structure, such as the vicinity of seating area 50, the interior shell segments do not lie close enough to the exterior shell segments to form the sandwich wall construction desired. In areas where this is the case, the inner FRP layer of the sandwich wall is provided by hand-laying strips of resin-impregnated fabric on top of the LDPF layer prior to placement of the interior shell segment inside of the outer shell segment. In areas not accessible to camper occupants and therefore not requiring a smooth surface finish, this hand-laying of FRP is an acceptable alternative to the pre-molded liner segment 22 used to form the inside of the cabinets on the left cabin half.

A large portion of the work required to finish the interior of the cabin is completed at this stage, while the left and right cabin halves are still separate. Appliances are installed, cabinet doors attached, and upholstery work completed. Mold fixtures 32, 34 may be rotated to whatever orientation is optimum for installation of each of these items.

Figure 7:
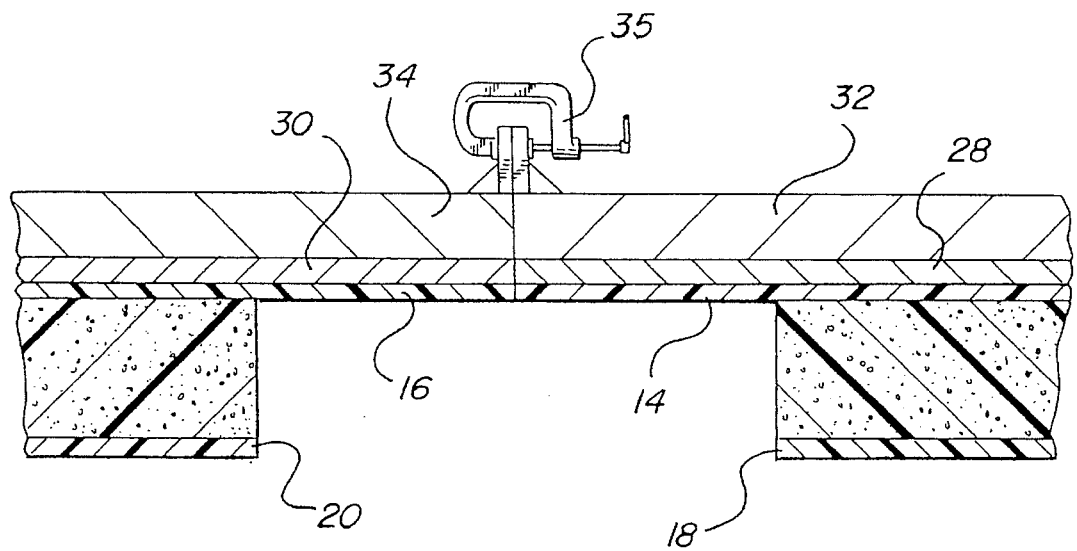
FIG. 7 is a detail of a cross-section through the cabin, molds, and mold supports of the present invention.

After the finish work on the left and right cabin halves is complete, mold fixtures 32, 34 are rotated to a vertical position and moved together to place the open edges of outer molds 28, 30 in abutting registration with each other. As seen in FIG. 6, at least one of support stands 38 is provided with wheels 76 which travel in tracks 78, thereby permitting mold fixtures 32, 34 to be rolled into contact with one another. This places outer shell segments 14, 16 in abutting registry along their edges. Clamping ears 35 are provided along the edges of mold fixtures 32, 34 to permit the fixtures to be securely clamped together, as seen in FIG. 7. Because the two cabin halves are still inside their respective mold fixtures 32, 34, they maintain a high level of dimensional accuracy and so may be very precisely aligned along the entire edge of contact.

As seen in FIG. 7, interior shell segments 18, 20 are of a lesser overall width than exterior shell segments 14, 16 so that when exterior shell segments 14, 16 are placed in abutting registry, the proximate edges of interior shell segments 18, 20 are still separated by a distance of approximately four to six inches. The gap between interior shell segments 18, 20 is filled and the left and right cabin halves bonded together by applying a layer of LDPF to the inner surfaces of outer shell segments 14, 16, which are exposed in the gap area and placing layers of resin-impregnated fabric over the LDPF to match the thickness of the wall sandwich on either side. Resin present in the LDPF is drawn by capillary action into the seam between the edges of outer shell segments 14, 16, and bonds those two segments together as the resin cures. To permit access to the interior of the cabin structure for this bonding procedure, mold fixtures 32, 34 are designed so that the cutouts 31, 33 in the rear of outer molds 28, 30 corresponding to the location of passenger door 74 remain unobstructed. Thus, when mold fixtures 32, 34 are moved together to mate the left and right cabin halves, an opening is preserved large enough to allow workers to pass into and out of the cabin as necessary.

An alternative method of joining the left and right cabin halves is shown in FIG. 2. In this embodiment of the invention the left and right cabin halves are assembled from their respective exterior and interior shell segments as described above, but are removed from their respective mold fixtures 32, 34 before the appliances are installed. The left and right cabin halves are then placed into left and right assembly frames 80, 82 which support the cabin halves in a vertical orientation. Each assembly frame 80, 82 consists of a metal framework 84 which positions and rigidly supports a plurality of positioning pads 86. Positioning pads 86 are "negatives" of selected corners and edges of outer shell segments 14, 16 and may conveniently be made by molding FRP over the appropriate areas of outer shell segments 14, 16. Alternatively, positioning pads 86 may be formed on a mock-up of the exterior of cabin 10 on which outer molds 28, 30 were produced. Positioning pads 86 are supported within framework 84 in a configuration to match the external geometry of each cabin half so that the assembled cabin halves are firmly supported and positioned inside of assembly frames 80, 82.

Installation of appliances and finishing work on the interior of the left and right cabin halves is completed after they are fixed in their respective assembly frames 80, 82. Casters 88 allow assembly frames 80, 82 to be rolled together to place the interior edges of the two cabin halves in registry. Assembly frames 80, 82 are clamped in this position by means of clamping surfaces 90 and the left and right cabin halves are then bonded together in the manner described above.

Figure 5:
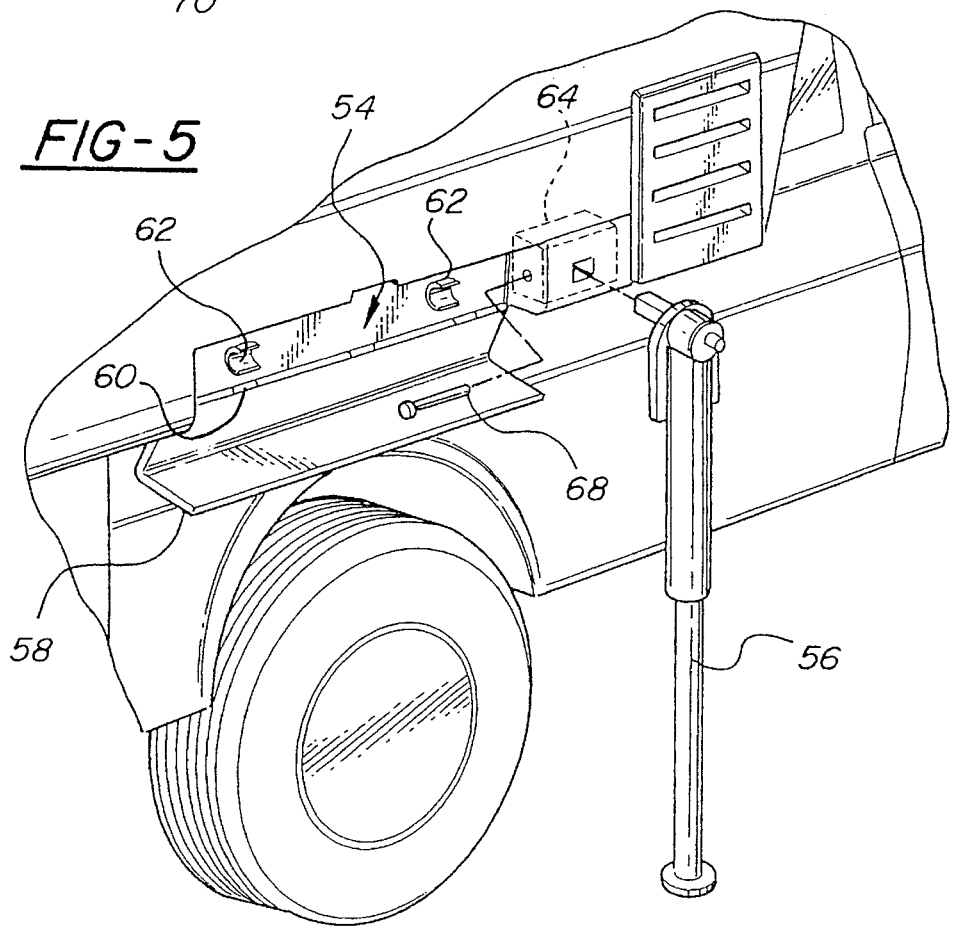
FIG. 5 is a detail of the exterior of the cabin structure showing provisions for enclosed storage of a jack stand.

As is customary for pick-up truck campers, cabin 10 is provided with telescoping jack stands 56 which are used to support cabin 10 when it is not mounted on a pickup truck. Three jack stands 56 are required to provide stable tripod support for camper 10. In accordance with the present invention, jack stands 56 are carried inside of a pair of recessed compartments 54 formed along the lower, outside edges of left and right outer shell segments 14, 16. FIG. 5 shows compartment 54 located on right outer shell segment 14 and it should be understood that the following description applies identically to the compartment located on the left side, except that the left side compartment contains two jack stands.

Compartment 56 is covered by a molded door 58 which is attached to outer shell segments 14 by hinge 60 and lies flush with the exterior of camper 10 when closed and latched. Jack stand 56 is retained for carriage inside of compartments 54 by latching means 62. Immediately adjacent to compartment 54 and internal to the camper 10 is a mounting bracket 64 by means of which jack stand 56 is attached to camper 10 when in use.

To mount jack stand 56 to the cabin, it is removed from compartment 54 and a mounting shaft 66 formed integrally with the upper end of the jack stand is inserted into mounting bracket 64. A locking pin 68 is inserted from the inside of compartment 54 to pass through aligned holes in mounting bracket 64 and mounting shaft 66 to secure jack stand 56 in a vertical position as shown in FIG. 5. Door 58 is then closed and latched and jack stand 56, along with the two jack stands on the opposite side of cabin 10, is extended to a length sufficient to lift camper 10 clear of pick-up truck 12. Pick-up truck 12 is then driven out from under camper 10 leaving it supported on jack stands 56. Additional jacks or blocks (not shown) may be placed under camper 10 to provide more complete support.

Figure 8:
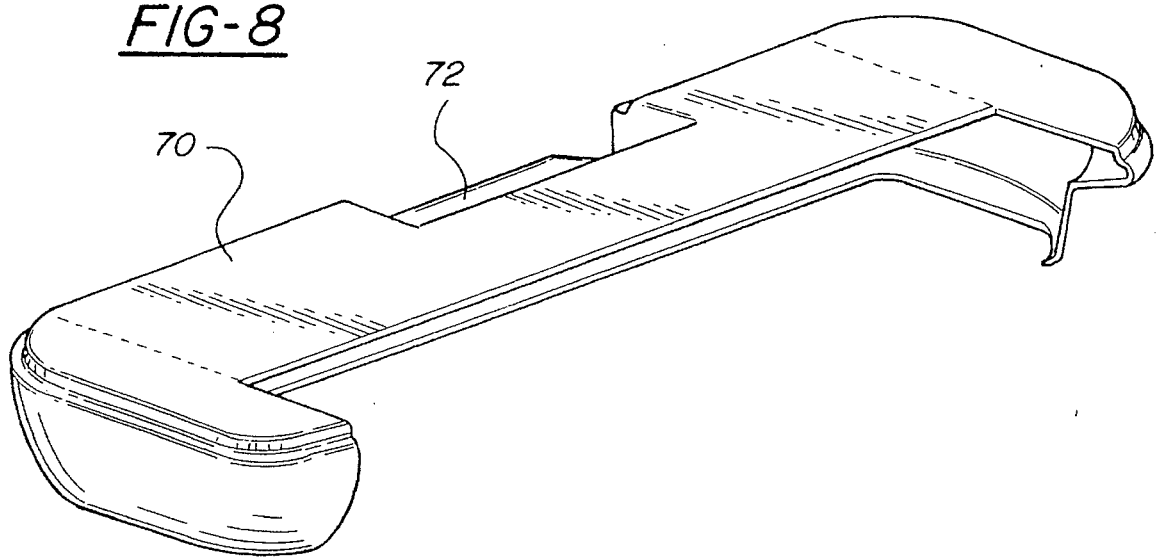
FIG. 8 is a perspective view of a holding tank cover according to a further feature of the present invention.

In the preferred embodiment of the invention, camper 10 also includes a molded FRP holding tank cover 70 which encloses and supports a holding tank (not shown) associated with a chemical toilet system (not shown). Because of its geometry, holding tank cover 70 cannot be formed as a single piece, but rather is molded in three separate pieces (see FIG. 8) which are then bonded together before being attached to the extreme rear underside of camper 10 by means of bolts (not shown). As is apparent in FIG. 9, holding tank cover 70 extends rearwardly beyond the rear surface of camper 10 and has a step 72 molded into its upper surface to assist passengers in entry and egress through the passenger door 74. Bolts are used to attach holding tank cover 70 to camper 10 so that it may be removed and reattached if necessary to repair or replace the holding tank which it encloses.

I claim:

1. A method of producing a recreational vehicle cabin by forming a right cabin segment and a left cabin segment and subsequently joining the segments into a unitary structure, the method comprising the steps of:

fabricating a right female mold having a longitudinal axis and a molding cavity shaped to match the exterior contours of the right cabin segment, the periphery of the molding cavity defining a substantially planar right mold edge lying parallel with the right mold longitudinal axis;

fabricating a left female mold having a longitudinal axis and a molding cavity shaped to match the exterior contours of the left cabin segment, the periphery of the mold cavity defining a substantially planar left mold edge lying parallel with the left mold longitudinal axis;

forming a right and a left exterior shell segment inside of the right and left female molds respectively;

forming at least one rigid left interior shell segment outside of the left female mold and at least one rigid right interior shell segment outside of the right female mold, the left and right interior shell segments shaped to fit inside of and match at least a portion of the inside contours of the left and right exterior shell segments respectively;

securing the at least one left and at least one right interior shell segments inside of the left and right exterior shell segments respectively to form the left and right cabin segments respectively;

rotating the right and left female molds about their respective longitudinal axes to place the right and left mold edges in vertical and parallel planes;

moving at least one of the female molds to place the right and left mold edges in abutting registry with one another;

joining the left and right cabin segments together to form a unitary structure by applying a joining material along the inside of the registered right and left mold edges, access to the inside of the structure being provided by at least one access cutout passing through at least one of the female molds; and separating the female molds and removing the unitary structure therefrom.

2. The method of claim 1 in which the interior and exterior shell segments are made of a fiber-reinforced composite material.

3. The method of claim 2 wherein the securing step comprises:

applying a layer of polyurethane foam to the inside surfaces of the exterior shell segments; and inserting the interior shell segments into their respective exterior shell segments to contact the foam layer and thereby form a wall consisting of a core of foam sandwiched between two layers of fiber-reinforced composite.

4. The method of claim 3 wherein the forming, securing and joining steps are performed in a period of time substantially less than the time required for the fiber-reinforced composite and the polyurethane foam to cure fully.

5. The method of claim 1 wherein the interior shell segments are shaped to provide desired interior contours of the recreational vehicle cabin, including one or more of the following: counters, seating areas, sleeping areas, storage cabinets, appliance housings, shower enclosure.

6. The method of claim 3 wherein when the left and right female molds are in abutting registry prior to the joining step, proximate edges of the left and right exterior shell segments are also in abutting registry with one another while proximate edges of the left and right interior shell segments are separated by a gap running along substantially the entire length of the left and right exterior shell segment edges, and the joining step comprises:

applying a layer of polyurethane foam to the inner surfaces of the exterior shell segments in the gap area, the thickness of the layer substantially equal to the thickness of the core of foam of the sandwich wall on either side; and applying a layer of fiber-reinforced composite material over the foam layer in the gap area, the thickness of the layer substantially equal to the thickness of the adjacent interior shell segments, thereby extending the existing sandwich wall structure to fill the gap area.

7. The method of claim 1 wherein prior to the securing step, plumbing components and electrical wiring are attached to the interior shell segments in positions such that the plumbing and wiring are trapped between the interior and exterior shell segments during the securing step.

8. A method of producing a recreational vehicle cabin by forming a right cabin segment and a left cabin segment which are substantially mirror images of one another and subsequently joining the segments into a unitary structure, the method comprising the steps of:

fabricating a right female mold having a longitudinal axis and a molding cavity shaped to match the exterior contours of the right cabin segment, the periphery of the molding cavity defining a substantially planar right mold edge lying parallel with the right mold longitudinal axis, the mold pivotable about a first pivot axis parallel with the right mold longitudinal axis;

fabricating a left female mold having a longitudinal axis and a molding cavity shaped to match the exterior contours of the left cabin segment, the periphery of the molding cavity defining a substantially planar left mold edge lying parallel with the left mold longitudinal axis, the mold pivotable about a second pivot axis parallel with the left mold longitudinal axis;

forming a right and a left exterior shell segment inside of the right and left female molds respectively by applying one or more layers of fiber-reinforced plastic to each of the mold cavities;

forming at least one left interior shell segment and at least one right interior shell segment from fiber-reinforced plastic at locations remote from the left and right female molds, the left and right interior shell segments each having an outer surface shaped to fit inside of and substantially conform to at least a portion of the inner surface of the left and right exterior shell segments respectively and an inner surface shaped to provide desired interior contours of the recreational vehicle cabin;

applying a layer of a low-density foam to the inner surfaces of each of the exterior shell segments;

inserting the interior shell segments into their respective exterior shell segments to contact the foam layer and form a left and a right cabin segment, the cabin segments having walls consisting of a layer of the foam sandwiched between the exterior and interior shell segments;

rotating the right and the left female molds about their respective pivot axes so that the first and second mold edges lie in vertical and parallel planes;

moving at least one of the female molds to place the right and left mold edges in abutting registry with one another and the right and left cabin segments in abutting registry with one another;

joining the left and right cabin segments together to form a unitary structure by applying a joining material along the inside of the registered left and right cabin segments, access to the inside of the structure being provided by at least one access cutout passing through at least one of the female molds; and separating the female molds and removing the unitary structure therefrom.

* * * * *